Jan. 9, 1962 S. BLOOM 3,015,859
PROCESS FOR MOLDING COVERED RIGID AND SEMIRIGID BODIES
Filed May 13, 1959 4 Sheets-Sheet 2

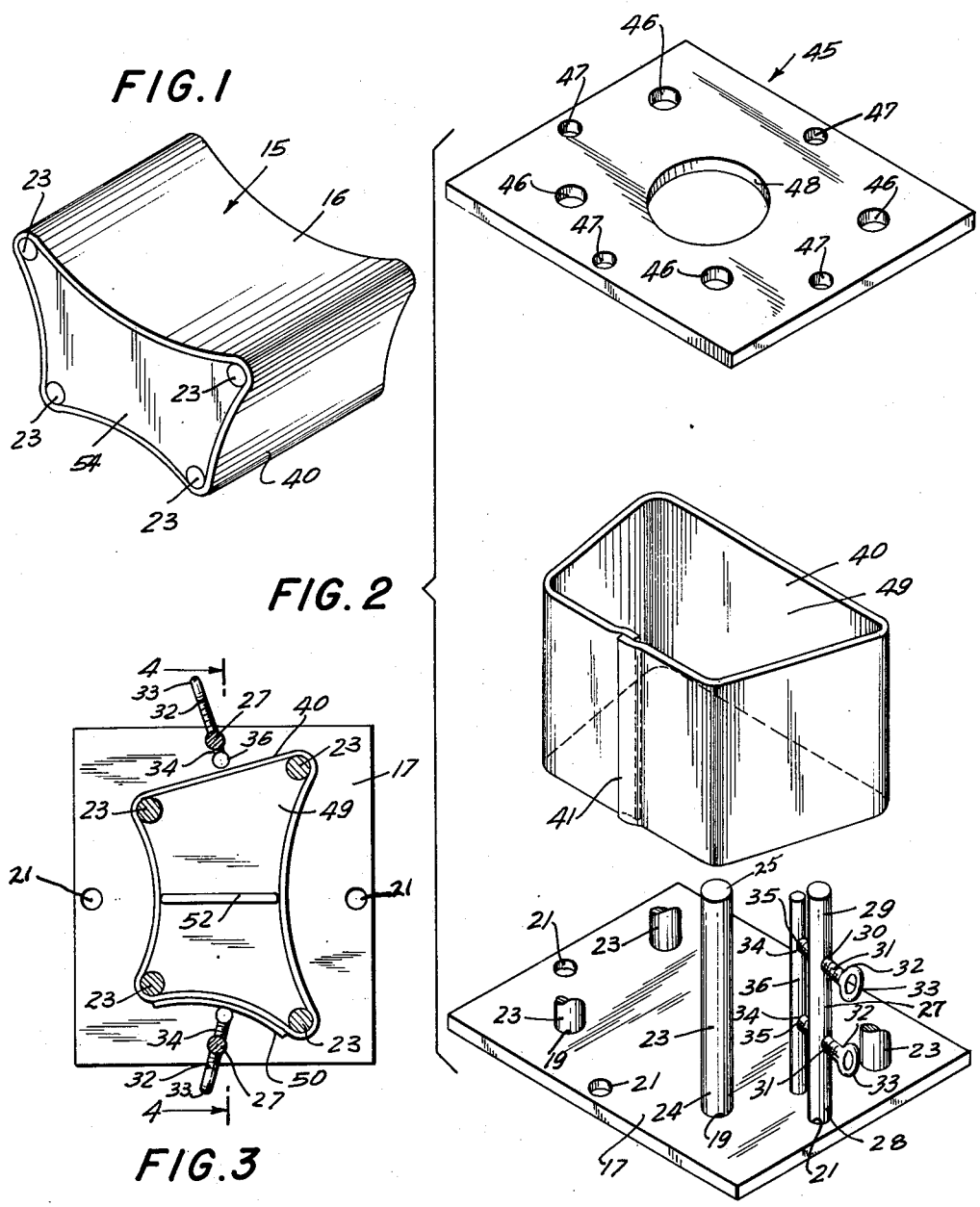

Jan. 9, 1962 S. BLOOM 3,015,859
PROCESS FOR MOLDING COVERED RIGID AND SEMIRIGID BODIES
Filed May 13, 1959 4 Sheets-Sheet 3

United States Patent Office 3,015,859
Patented Jan. 9, 1962

3,015,859
PROCESS FOR MOLDING COVERED RIGID AND SEMIRIGID BODIES
Sol Bloom, 264 E. 7th St., New York, N.Y., assignor of one-half to Sheldon J. Baer, Commack, N.Y.
Filed May 13, 1959, Ser. No. 812,995
4 Claims. (Cl. 18—59)

The present invention relates to an improved process for molding covered rigid and semirigid bodies and, more particularly, to a process for manufacturing covered rigid and semirigid bodies without the use of expensive molds.

In the past rigid and semirigid bodies have been molded by using molds which are substantial in size, expensive to design and expensive to produce. In small quantity production the cost of the mold can often greatly affect the manufacturing cost of a product. In the present invention the mold is a flexible piece of material which is readily shaped by various inexpensive shaping means and the flexible material becomes an actual part of the finished product. By following the present process, the molding costs are greatly reduced. The present invention is particularly useful in small quantity production or in operations where the shapes of the finished products are to have a variety of forms. The present process can be used to manufacture a variety of furniture items, household items and construction materials. The materials used in the present invention are light in weight and low in cost. Kits containing the apparatus used in the present invention could be sold to hobbyists who could readily construct molded items of furniture and the like in home workshops.

It is an object of the present invention to provide an improved process for molding rigid and semirigid bodies in which the cover into which the molding material is poured becomes an actual part of the finished product.

Another object of the present invention is to provide a process for molding in which the mold can be readily changed from one shape to another so that the finished products can be in a variety of desired forms.

An additional object of the present invention is to provide a process for molding covered rigid and semirigid bodies in which the materials used are light in weight and low in cost and which would permit amateurs to construct molded items at home.

A further object of the present invention is to provide a process for manufacturing molded covered rigid and semirigid bodies which permits rapid manufacturing on a small scale or on a mass basis at low cost.

Other objects of the invention will in part be obvious and will in part appear hereinafter.

The invention accordingly comprises the several steps and the relation of one or more of such steps with respect to each of tthe others thereof, which will be exemplified in the process hereinafter disclosed, and the scope of the invention will be indicated in the claims.

For a fuller understanding of the nature and objects of the invention, reference should be had to the following detailed description taken in connection with tthe accompanying drawings, in which:

FIG. 1 is a perspective view, as viewed from the front, top and side, of an embodiment of a covered rigid body which can be manufactured by following the process described in the present invention;

FIG. 2 is a partially exploded perspective view, as viewed from the front, top and side, of apparatus used in the present invention to mold covered rigid bodies of the FIG. 1 embodiment;

FIG. 3 is a top view of some of the apparatus shown in FIG. 2, and illustrates a method for placing the cover material around dowels and methods for shaping the cover material;

Figure 4:
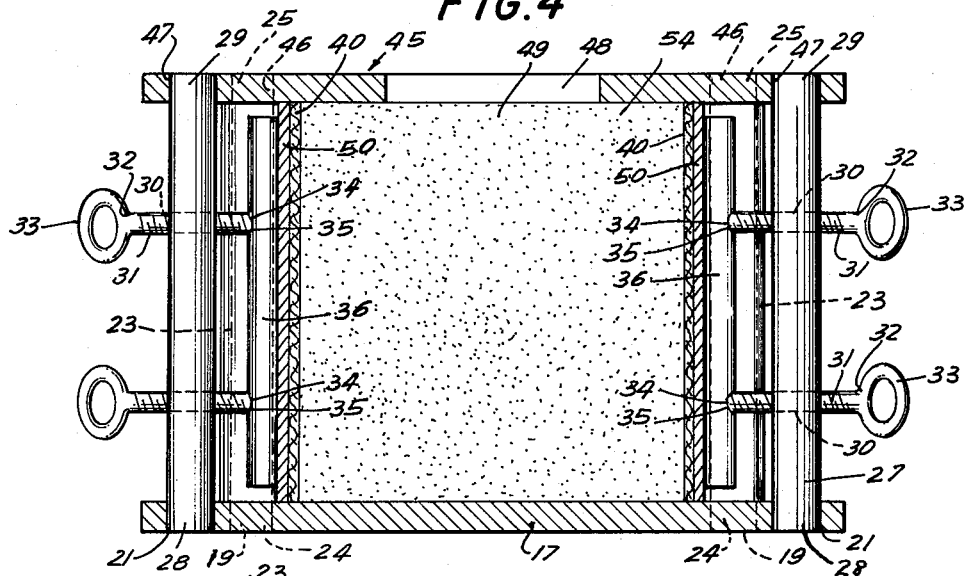
FIG. 4 is a lateral sectional view, to an enlarged scale, of the apparatus shownin FIG. 3, taken subsantially along lines 4—4 of FIG. 3, and showing the shaping of the cover material and the addition of the molding material.

Referring to the drawing, in which like numerals identify similar parts throughout, it will be seen that, as illustrated in FIG. 1, a covered rigid body or structure 15 of any desired shape, for example a stool 16, can be manufactured by the process of the present invention. The steps and apparatus for manufacturing covered rigid body 15 are shown in FIGS. 2 to 5, inclusive.

An embodiment of the apparatus suitable for manufacturing the covered rigid body 15 is shown in FIG. 2, and can include an end plate or stand 17 having dowel holes 19, 19 and rod holes 21, 21. Dowels 23, 23 which are preferably of wood, but can be of any desired rigid material, have lower ends 24, 24 and upper ends 25, 25. The dowels 23, 23 are positioned with their lower ends removably mounted in dowel holes 19, 19 in stand 17. Rods 27, 27 which can be of any rigid material, have lower ends 28, 28 and upper ends 29, 29. The rods 27, 27 are preferably positioned with their lower ends 28, 28 fixed in rod holes 21, 21 in stand 17.

Threaded holes 30, 30 extend laterally through rods 27, 27 and are engaged by turn screws 31, 31. The outboard ends 32, 32 of the turn screws 31, 31 are provided with handles 33, 33 which can be used to turn the screws. The inboard ends 34, 34 of the turn screws 31, 31 are free to rotate within sockets 35, 35 provided in indentation pegs 36, 36.

A flexible cover 40 of any desired material such as cloth, plastic sheets, straw, canvas, paper products or leather, can be mounted on the outboard sides of dowels 23, 23 and inside of indentation pegs 36, 36. Cover 40 can be a continuous belt of flexible material which, if desired, can be formed by joining together a single strip of material at seam 41 by sewing, gluing or fusing. The appearance of cover 40 can be enhanced by having its external surface quilted, piled or patterned.

A top plate 45 is provided with dowel holes 46, 46 and rod holes 47, 47 for removably inserting upper ends 25, 25 of dowels 23, 23 and upper ends 29, 29 of rods 27, 27, respectively. An opening 48 is also provided in top plate 45 for pouring the material to be molded into the cavity 49 formed by the flexible cover 40, the end plate 17 and the top plate.

The shape of flexible cover 40 is formed by the location of dowels 23, 23 and by turning screws 31, 31 to force pegs 36, 36 inwardly thereby forming the desired indentations in cover 40. Pegs 36, 36 can either directly engage the flexible cover 40, or can engage semiflexible sheets 50—50, e.g. thin gage sheet metals, flexible fiberboards, thin plywoods or linoleum, which engage the flexible cover. The use of semiflexible sheets 50 provides a smoother indentation in the flexible cover 40 than is provided by pegs 36, 36 alone.

Flexible cover 40 can be shaped by other means, such as use of tie cords 52, as shown in FIG. 3, which can be tied inside the structure 15 from one side of cover 40 to the other and which will pull cover 40 inward from the inside rather than the use of the above described external clamps or pegs 36, 36 which push the cover inward from the outside.

After the flexible cover 40 has been shaped in the desired form, molding material 54 is poured through opening 48 into the cavity 49 and the molding material is allowed to set. A variety of types of settable molding materials 54 might be employed to fill the inside of flexible cover 40. One can employ various plastics, such as a polyurethane, e.g. urethan (ethyl carbamate) or polyether in a foaming form, which upon setting becomes rigid plastic foam.

Figure 5:
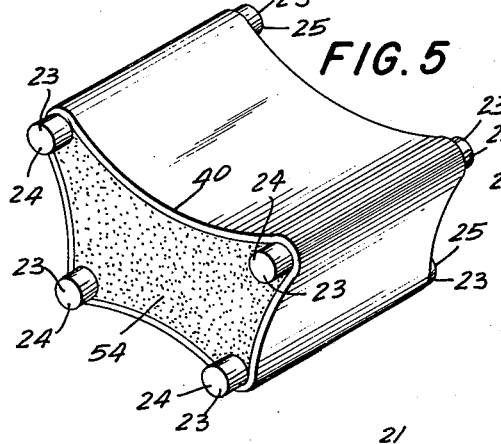
FIG. 5 is a perspective view, as viewed from the front, top and side, of the product molded in the FIG. 4 apparatus, after the product has been removed from the mold.

When the molding material 54 has hardened top plate 45 can be removed, turn screws 31, 31 loosened and the molded body 15 removed. As shown in FIG. 5, when molded body 15 is removed from stand 17 the molded body comprises the cover 40, the dowels 23, 23 and the hardened molding material 54. The finished product, as shown in FIG. 1, is obtained by sawing off the lower ends 24, 24 and the upper ends 25, 25 of the dowels 23, 23.

If tie cords 52 are used, the tie cords would be left inside the molding material 54. Any external portions of the tie cords, of course, could be clipped off.

Thus, the body of the structure 15 consists of a set rigid mass of molded material 54 which was poured into the shaped mold constituted by the flexible fabric 40 which is to cover the finished article.

Figure 7:
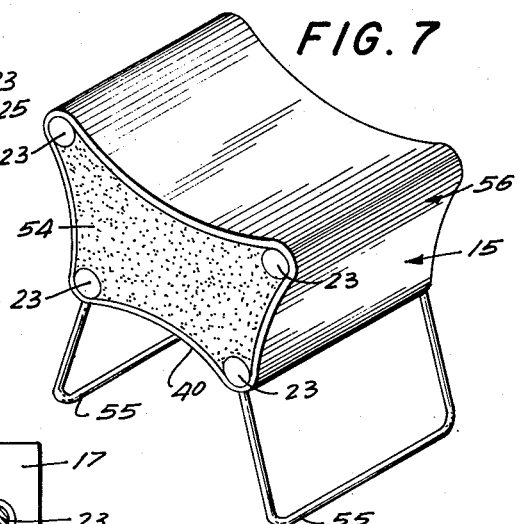
FIG. 7 is a perspective view, as viewed from the front top and side, of the product molded in FIG. 6, after the product has been removed from the mold and after the ends of the dowels have been removed.
Figure 6:
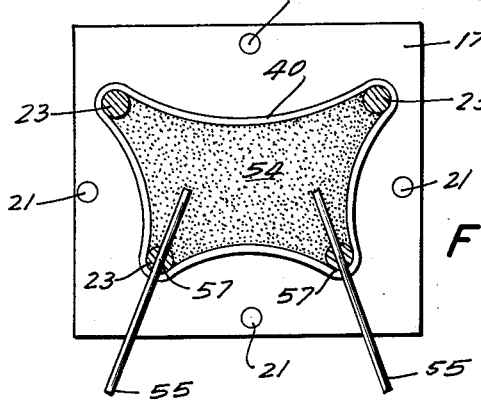
FIG. 6 is a top view, showing the addition of legs to a body being molded similar to the molding of the body in FIG. 4.

The embodiment of the covered rigid body 15 shown in FIG. 7 is similer to the FIG. 1 embodiment, with the addition of U-shaped legs 55—55 of iron or other suitable material, thereby making the stool 16 into a chair 56. As shown in FIG. 6, leg holes 57, 57 are provided where needed in cover 40 and dowels 23, 23 and the U-shaped legs 55—55 are inserted through the cover and through the dowels before the molding material 54 is poured. After the molding material 54 is poured and hardened the legs 55—55 become set in the molding material and become an integral part of the chair structure 56.

Similarly handles, armrests, inserts for anchoring screws or bolts, or other material can be inserted into the cover 40 before the molding material 54 is poured so that the added parts become integral with the molding material after the molding material sets.

Figure 8:
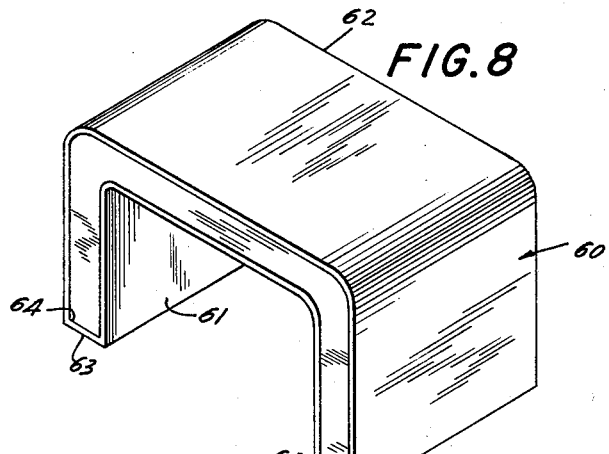
FIG. 8 is a perspective view, as viewed from the front, top and side, of another embodiment of a covered rigid body, similar to the FIG. 1 embodiment, of another covered rigid body which can be manufactured by following the process described in the present invention.

The practice of the present invention is not limited to flexible fabrics for cover 40 since flexing semirigid sheet materials, such as 1/16 inch thick plywood, might be employed for the surfacing sheet. Such thin semirigid material can be flexed around curvatures of a radius of approximately three inches. As shown in FIG. 8, a U-shaped bench structure 60 can be made having a bent inner sheet 61 of plywood or similar material and a bent outer sheet 62 and two bottom bent strips 63—63 to cover the leg ends 64—64.

Figure 9:
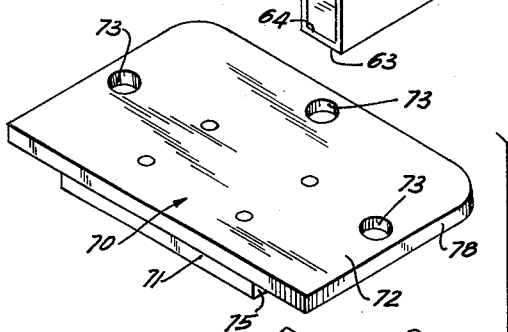
FIG. 9 is a partially exploded perspective view, as viewed from the front, top and side, of apparatus used in the present invention to mold covered rigid bodies of the FIG. 8 embodiment.
Figure 11:
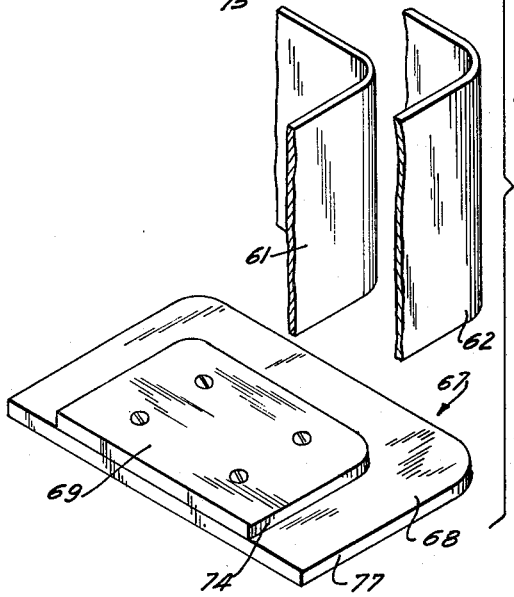
FIG. 11 is a lateral sectional view of the apparatus and body of the FIG. 10 embodiment, taken substantially along line 11—11 of FIG. 10.

Apparatus suitable for use in the process of manufacturing the bench structure 60 is shown in FIG. 9. The apparatus can include a stepped base plate 67, having a lower level 68 and an upper level 69, and a corresponding upper stepped plate 70, having a lower level 71 and an upper level 72. Upper stepped plate 70 is provided with openings 73, 73 for pouring molding material 54. The outer edge 74 of the upper level 69 of stepped base plate 67 and the corresponding outer edge 75 of the lower level 71 of the upper stepped plate 70 are shaped to the desired form to permit the inner sheet 61 to be bent around the outer edges 74 and 75 to the desired shape.

Straps 76, 76, of belting material, cord, metal tying bands or similar material, can be secured about the inner sheet 61 to hold the inner sheet in place. Similarly, the outer edge 77 of the lower level 68 of base plate 67 and the corresponding outer edge 78 of the upper level 72 of the upper plate 70 are shaped to the desired form to permit the outer sheet 62 to be bent around the outer edges 77 and 78 to the desired form. Straps 80, 80 which also can be of belting material, cord, metal tying bands, or similar material, are provided about the outer sheet 62 to secure the outer sheet to the outer edges 77 and 78.

The ends of straps 76, 76 can be fastened together by fastening means 81, 81. If metal tying bands are used for straps 76, 76 the ends can be clamped together by a distorted sleeve in the conventional manner. If belting material is used, the belting material can be tied, buckled or otherwise fastened together. Similarly, the ends of straps 80, 80 can be fastened together by fastening means 81, 81.

In the FIG. 8 embodiment no spacing dowels are required since base plate 67 and upper plate 70 have longitudinal rigidity to hold sheets 61 and 62 apart.

After sheets 61 and 62 are secured to plates 67 and 70 the molding material 54 is poured into openings 73, 73 and allowed to set. When the molding material 54 has set, the plates 67 and 70 are removed and the outer strap 80 removed. Of course, portions of the inner straps 76, 76 will be inside the structure and will be "lost" therein when the structure 60 is finished, but the external portions of inner straps 76, 76 can be clipped off or removed.

Figure 12:
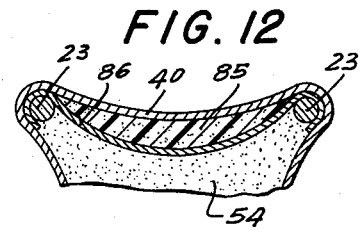
FIG. 12 is a sectional view, with parts broken away of a body, similar to the body shown in FIG. 5, in which a soft cushioning material has been added to the body.
Figure 10:
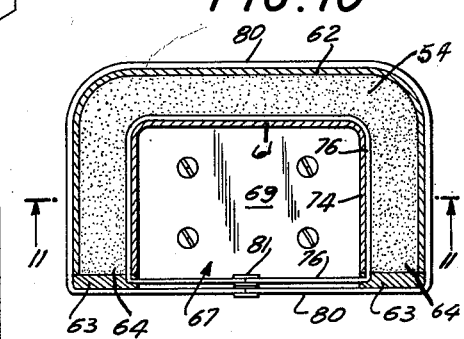
FIG. 10 is a top sectional view of a body being molded in the apparatus shown in FIG. 9.

To enhance the comfort of the stool 15, shown in FIG. 1, or the chair 56, shown in FIG. 7, a cushion material 85, as shown in FIG. 12, can be introduced between the cover 40 and the molding material 54 before the molding material is poured. The cushion material 85 can be held in place by an inner cover material 86 which can be secured about dowels 23, 23. After the molding material 54 has set, the finished product manufactured by the present process will comprise a hard molded material 54, an outer cover 40 and a soft cushion 85 between the outer cover and the molded material. Cushion material 85 can be of any desired soft material such as, foam rubber, or down, which can be introduced into the cavity between cover 40 and inner cover 86 in a solid form, or a soft plastic material which can be introduced into the cavity between cover and inner cover material in a liquid form and permitted to harden similar to molding material 54.

Figure 13:
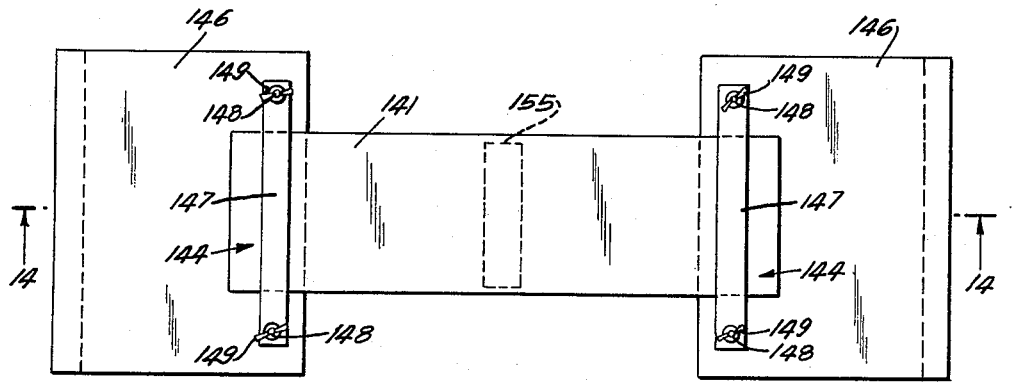
FIG. 13 is a top view of another embodiment of apparatus for molding covered rigid and semirigid bodies, similar to the FIG. 2 apparatus.
Figure 14:
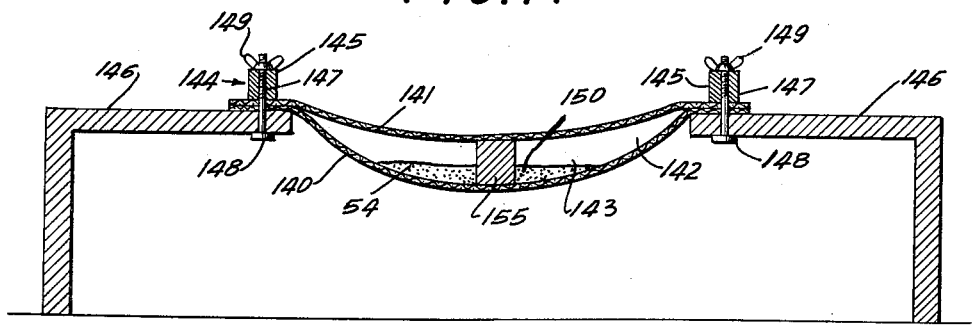
FIG. 14 is a lateral sectional view of the apparatus of the FIG. 13 embodiment, taken substantially along line 14—14 of FIG. 13.

A further embodiment of the present invention is shown in FIGS. 13 and 14 in which a lower portion of flexible sheet material 140 and an upper portion of flexible sheet material 141 are arranged about an internal space 142 defining a cavity 143. Holding means 144—144 are provided to determine the external shape of portions of flexible sheet material 140 and 141 when mobile molding material 54 is loaded into cavity 143. Holding means 144—144 for anchoring or mounting the portions of flexible sheet material can be in any desired form, such as clamps 145—145, shown in FIGS. 13 and 14. Clamps 145—145 comprise end brackets 146—146 and holding blocks 147—147 which if desired can be held in place by bolts 148, 148 and wing nuts 149, 149.

The portions of sheet material 140 and 141 can be joined together at the ends or provided with end plates to form the cavity 143. The portions of sheet material 140 and 141 are held in place by slipping them under blocks 147 and tightening wing nuts 149, 149.

Settable molding material 54 is fed into cavity 143 to provide a core body 150 faced with the bands of flexible material. The molded covered body which comprises the set molding material 54 and the facing sheet material 140 and 141 can be removed from the holding means 144 after the molding material has set.

Sheet material 140 and 141 can be internally supported and shaped by one or more internal floating spacers 155. The sheet material also can be shaped by external or internal application of force such as tie cords (such as tie cords 52 shown in FIG. 3), suction devices, rods, plates, etc.

Desired internal shapes can also be obtained by insertion of one or more pneumatic bags into cavity 143 before the molding material 54 is poured. After the molding material has hardened, the pneumatic bag can be opened or removed to obtain a cavity within the molding material which might be used as a storage space, such as in a decorative cooler or heat isolating compartment.

The invention also might be practiced to form covered cylindrical column elements by providing a tube of flexible sheet or webbed material which can be inserted into a cylindrical molding bore. When molding material is injected inside the sheet material, the walls of the sheet material swell out to form a cylindrical form against the internal walls of the cylinder for rigid backing until the molding material 54 is set.

It will thus be seen that the objects set forth above, among those made apparent from the preceding description, are efficiently attained and, since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A process for molding covered rigid bodies comprising securing a piece of continuous fabric about a plurality of rigid dowels which are held in place by end plates through which the ends of said dowels protrude; shaping said fabric about said dowels by indenting said fabric between adjacent dowels by forcing a flexible board against the side of said fabric between said adjacent dowels; inserting legs into said fabric and into said dowels; pouring plastic molding material through an opening in one of said end plates into the cavity inside said fabric; permitting said plastic molding material to harden; removing said end plates; and removing said protruding ends of said dowels.

2. A process for molding covered rigid bodies comprising securing a piece of continuous fabric about a plurality of rigid dowels having ends protruding outside said fabric; shaping said fabric about said dowels by indenting said fabric between adjacent dowels by forcing a flexible board against the side of said fabric between adjacent dowels; inserting arms into said fabric and into said dowels; pouring polyurethane through an opening in one of said end plates into the cavity formed by said fabric; permitting said polyurethane to harden; removing said end plates; and removing said protruding ends of said dowels.

3. A process for molding covered rigid bodies comprising securing a piece of continuous fabric about a plurality of rigid dowels which are held in place by end plates through which the ends of said dowels protrude; shaping said fabric about said dowels by indenting said fabric between adjacent dowels by forcing a flexible board against the side of said fabric between adjacent dowels; inserting legs into said fabric and into said dowels; inserting arms into said fabric and into said dowels; pouring polyurethane through an opening in one of said end plates into the cavity inside said fabric; permitting said polyurethane to harden; removing said end plates; and removing said protruding ends of said dowels.

4. A process for molding bodies comprising securing a piece of flexible material about a plurality of rigid members; securing a second inner piece of flexible material about at least some of said rigid members; inserting cushioning material into one of the cavities between said inner piece of flexible material and said outer piece of flexible material; pouring molding material into the other cavity between said inner piece of flexible material and said outer piece of flexible material; and permitting said molding material to harden.

References Cited in the file of this patent

UNITED STATES PATENTS

| | | |
|---|---|---|
| 1,392,496 | Hain | Oct. 4, 1921 |
| 2,217,137 | Roth et al. | Oct. 8, 1940 |
| 2,410,888 | Lucy | Nov. 12, 1946 |
| 2,706,309 | Lampman | Apr. 19, 1955 |
| 2,708,773 | Bacon | May 24, 1955 |